United States Patent [19]

Lofquist

[11] 3,898,200

[45] Aug. 5, 1975

[54] CATIONIC DYEABLE POLYAMIDE OF IMPROVED PHYSICAL PROPERTIES

[75] Inventor: Robert Alden Lofquist, Richmond, Va.

[73] Assignee: Allied Chemical Corporation, Petersburg, Va.

[22] Filed: June 12, 1974

[21] Appl. No.: 478,474

Related U.S. Application Data

[63] Continuation-in-part of Ser. No. 286,629, Sept. 6, 1972, Pat. No. 3,828,009.

[30] Foreign Application Priority Data

Mar. 28, 1973 Canada.................. 167391

[52] U.S. Cl............. 260/78 L; 161/177; 260/78 R; 260/78 S; 260/78 SC; 264/210
[51] Int. Cl............................................ C08g 20/18
[58] Field of Search.... 260/78 R, 78 L, 78 S, 78 SC

[56] References Cited
UNITED STATES PATENTS

| | | | |
|---|---|---|---|
| 3,389,549 | 6/1968 | David.................. | 260/78 L |
| 3,477,899 | 11/1969 | Kubitzek et al.............. | 260/78 L |
| 3,709,865 | 1/1973 | Lofquist et al................. | 260/18 N |
| 3,823,120 | 7/1974 | Berenbaum et al............. | 260/78 L |

*Primary Examiner*—Lucille M. Phynes
*Attorney, Agent, or Firm*—Richard A. Anderson

[57] ABSTRACT

A cationic-dyeable polyamide, polymerized from ω-aminocarboxylic acids or their lactams, of improved physical properties can be made by using from 0.25 to 0.85 mole percent (based on the polyamide) of the sodium salt of a sulfonated dicarboxylic acid such as 5-sulfoisophthalic acid and 0.07 to 0.65 mole percent of an N-sulfoalkyl alkyldiamine such as N-(4-sulfobutyl)-hexamethylenediamine, or N-(2-sulfoethyl)m-xylylenediamine. A polyamide results containing the respectively same number of sulfo groups, but with less diluent and consequently having a higher melting point. The diacid can be a sulfonate derivative of a phthalic acid, or of fluorene, etc. The diamine can be a sulfonate derivative of hexamethylenediamine, metaxylylenediamine, etc. The use of the combination of additives eliminates the necessity of adding a diamine or dicarboxylic acid to achieve full polymerization.

10 Claims, No Drawings

CATIONIC DYEABLE POLYAMIDE OF IMPROVED PHYSICAL PROPERTIES

CROSS REFERENCE TO RELATED APPLICATIONS

This application is a continuation-in-part of Ser. No. 286,629, filed Sept. 6, 1972 now U.S. Pat. No. 3,828,009, granted Aug. 6, 1974. This application contains claims to non-elected species from that parent application and new examples to support those species.

BACKGROUND OF THE INVENTION

This invention relates to a fiber forming synthetic polyamide polymerized from $\omega$-aminocarboxylic acids or their lactams and containing sulfonic acid groups linked to the polymer chain with $C_2$ or a $C_4$ to $C_6$ alkyl group; and also containing sulfonic acid groups linked to a benzene nucleus, which have an affinity for cationic dyestuffs.

Cationic dyeable nylon 6 is often made by adding 50 to 125 pound-moles of the sodium salt of 5-sulfoisophthalic acid per $10^6$ pounds of polymer to the lactam, i.e., about 0.5 to 1.5 mole percent of the sulfur compound. To permit polymerization to a high viscosity, from 0.3 to 1.5 mole percent of a diamine must be added. This dilution of caprolactam by additives lowers the melting point of the polymer. This cationic dyeable polyamide is disclosed in U.S. Pat. No. 3,184,436 to Magat, and U.S. Pat. No. 3,389,549 to David. Another proposed method is that in U.S. Pat. No. 3,454,535 to Bodesheim. Bodesheim teaches an additive linked to the polymer chain backbone by a $C_4$ to $C_6$ alkyl group.

A dicarboxylic acid must be added to permit polymerization to high molecular weight polyamides. In U.S. Pat. No. 3,296,204 to Caldwell, other aromatic sulfonic acids or salts are used as cationic-dyeable additives. However, in this case, also, a dicarboxylic acid must also be included in the polymerization ingredients. The use of the sulfonic acid or salt linked with $C_2$ alkyl groups to the polymer backbone in polyamide fiber is disclosed in allowed application Ser. No. 286,628, filed Sept. 6, 1972. Thus, the prior art requires either a diacid or diamine to be added to produce a high polymer.

SUMMARY OF THE INVENTION

It is an object of this invention to provide a new and useful polyamide.

Another object is to provide a fiber, filament, film or other shaped article which has affinity for basic dyestuffs.

A further object of this invention is to provide a polyamide polymerized from $\omega$-aminocarboxylic acids or their lactams with affinity for basic dyestuffs which has a higher melting point than previously known basic dyeable polyamides from caprolactam.

The present invention provides a novel synthetic linear polycarbonamide having recurring amide groups polyermized from $\omega$-aminocarboxylic acids or their lactams and as an integral part of the polymer chain at least 0.25, preferably 0.25 to 0.85 mole percent (based on weight of the polycarbonamide) of units of the structures:

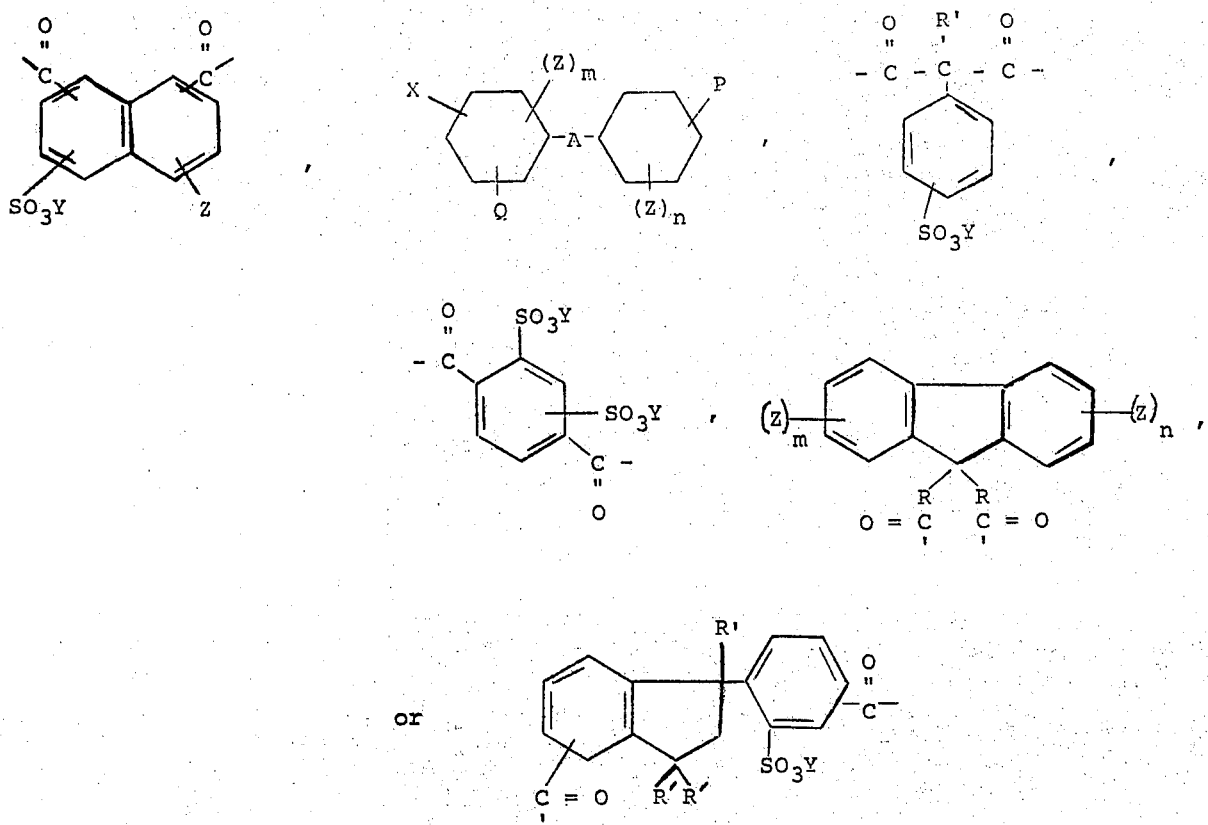

where X is a carboxyl, either P or Q is

and the other is H, and X and Q are not ortho to each other, Y is $NH_4$ or a metal of first or second group of the Periodic Table, $m+n = 1$ or 2, where Z is not ortho to a carboxyl; A is a direct bond, S, $SO_2$, O, $CH_2$, $OCH_2CH_2O$, $C(CH_3)_2$,

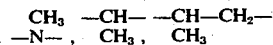

or

R is a straight chain radical of less than 10 carbon atoms, R' is H or R, Z represents H or $SO_3Y$, provided that the two carboxylic substituents are not spaced closely enough that imides can be formed, such as is the case with 1,8-dicarboxynaphthalene compounds, or sulfonated orthophthalic acid; and at least 0.07, preferably 0.07 to 0.65 mole percent of units selected from the group consisting of units of the structures:

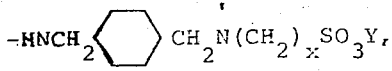 , 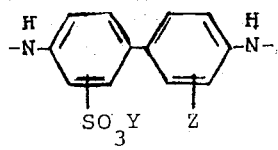 ,

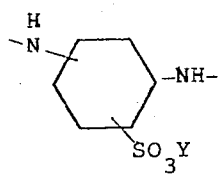 , 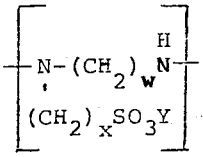 ,

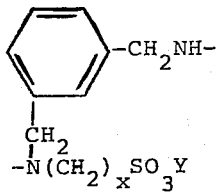

wherein x is 2, 4, 5 or 6, preferably 2, and w is 2 to 12, preferably 6, and Y is defined above.

In a typical preparation, the polymer is obtained by polymerizing the ω-aminocarboxylic acids or their lactams in the presence of one of the dicarboxylic acid structures shown above, preferably,

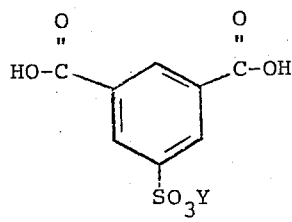

where Y is as defined above, preferably sodium or potassium, and a diamine compound shown above, preferably one selected from the group consisting of the N-(2-sulfoethyl)-m-xylenediamine sodium salt, or N-(2-sulfoethyl)-p-xylylenediamine sodium salt or of the formula:

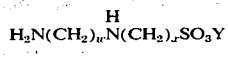

where Y, x and w are defined above and x is preferably 2, w is preferably 6;

The polymerization recipe may also contain additional ω-aminocarboxylic acid such as 6-aminohexanoic acid.

Light stabilizers and heat stabilizers may be added, as well as delustrants such as $TiO_2$. Copper salts should not be used as light stabilizers because they discolor the polymer.

Polymerization is conducted by melt polymerization, preferably at a temperature 30° to 50° above the melting point of the polyamide.

The relative amounts of the dicarboxylic acid and diamine should be adjusted such that in the extracted and dried polymer the amine end concentration is in the range of 12 to 35, preferably 20–25, gram-equivalents per $10^6$ grams of polymer. The polymer should have a relative formic acid viscosity from 30 to 70, a sulfur content, in the form of sulfo groups, of 1600 to 4000 ppm, and an excess of carboxyl groups over amine groups ranging from 0 to 80 gram-equivalents per $10^6$ grams of polymer.

The melt polymerization should be done under oxygen-free conditions, and a stream of an inert gas such as nitrogen should be passed through or over the molten material.

When the polymer has attained the desired melt viscosity, it is extruded from the reaction vessel in a ribbon or strand, cooled in water, and cut into chips.

Unreacted monomer is removed from the polymer by three to five extractions with enough water to cover the polymer chips at temperatures ranging from 90° to 110°C.

Some sulfonate is removed during this washing process, the amount depending on the number of washes and the temperature of the wash.

The washed polymer is then dried for 16 to 24 hours to reduce the moisture content to about 0.5 to 0.9 weight percent.

The dried polymer can then be shaped into filaments by conventional spinning techniques.

Yarns made according to this invention can be used for the usual textile applications, such as, for instance, knitted and woven fabrics, and tufted carpets.

Their physical properties closely approximate the polyamides which do not have sulfonic pendant groups. They have a marked affinity for basic dyes, however.

Examples of basic dyes which can be used to color fibers formed in accordance with the present invention are:

Safranine T C.I. Basic Red 2
Nabor Blue B C.I. Basic Blue 21
Astrazon Red BBl C.I. Basic Red 23
Astrazon Orange 3RL C.I. Basic Orange 27
Astrazon Blue 5GL C.I. Basic Blue 45

DESCRIPTION OF PREFERRED EMBODIMENTS

Example 1

N-(6-aminohexyl)-2-aminoethanesulfonic acid is prepared by the method described in U.S. Pat. No. 3,828,009, granted Aug. 6, 1974.

The diaminosulfonic acid of this example was titrated withh HCl and the equivalent weight was found to be 238, compared to a theoretical 224. The sulfur content was found to be 13.3 percent.

10.2 grams of the above diaminosulfonic acid was dissolved in a mixture of 1520 grams of caprolactam, 80 grams of ω-aminocaproic acid, 0.1644 gram of a 50 percent aqueous solution of hypophosphorous acid, and 0.0576 grams of manganous chloride tetrahydrate at 90°C. A solution of 4.5 grams of sodium carbonate in 50 cc of distilled water was added and then 19.55 grams of sulfoisophthalic acid sodium salt was also added.

This mixture was then charged to a 3-liter agitated reactor. The mixture was heated to 255°C. over a period of 1 hour while a nitrogen atmosphere was kept above the liquid. The liquid was stirred for 3½ more hours at 255°C. The polymer was then extruded out the bottom of the reactor, cut into cylindrical chips about 0.1 inch diameter and 0.1 inch long. Unreacted monomer was removed from the polymer by leaching four times at 100°C. with enough water to barely cover the chips. The polymer was then dried 16 hours at 100–105°C.

The product was a colorless, opaque polymer of 40.7 relative formic acid viscosity. The sulfur content was 2,450 ppm sulfur based on the weight of polymer.

The above polymer was spun, plied, and drawn at a draw ratio of 3.2 into a 140 filament/2100 denier yarn. The filaments were "Y" cross-section with a 3.2 modification ratio. The yarn was knitted into a sleeve, and dyed by immersing it for 1 hour at a temperature of 205°F. in a dyebath having the following composition:

1 percent Hypochem CDL-60 (made by Highpoint Chemical Co., Highpoint, N. C.)
2 percent Hypochem PND-11 (made by Highpoint Chemical Co., Highpoint, N. C.)
0.5 percent Sevron Blue GCN (C.I. Basic Blue 97) and sufficient monosodium phosphate or disodium phosphate to adjust the pH to 7.0 ± 0.2.

Percentages of dyebath components are based on the weight of fabric dyed.

The water to goods ratio was 40 to 1.

The sample was then scoured at 160°F. in a bath containing .01 percent acetic acid and 0.1 percent Hipochem CDL 60 for 30 minutes. The sleeve dyed a deep blue. A control polycaprolactam yarn, containing no sulfur as a sulfonate salt, dyes only to a very light shade under the same conditions. The melting point of the polymer prepared with both additives as determined by *Differential Thermal Analysis* (DTA) was 217°C., compared to 220°C. for the control without additives.

Example 2

(Comparative, dicarboxylic sulfonic acid only)

32.5 Grams of sulfoisophthalic acid sodium salt, 12.2 grams of metaxylylenediamine, 0.1644 gram of a 50percent solution of hypophosphorous acid, 0.0576 gram of manganous chloride tetrahydrate and 80 grams of ω-aminocaproic acid were dissolved in 1,520 grams of caprolactam at 90°C. The mixture was charged into a reactor, polymerized, leached and dried and spun into Y-cross-section yarn in the manner of Example 1. The yarn had a relative formic acid viscosity of 58.2. The sulfur content was 2,590 ppm. The DTA melting point was 214°C.

The yarn was knitted into a sleeve and the sleeve was dyed in a bath competitively with a section of sleeve described in Example 1 of equal weight. The dye bath composition, the dyeing conditions and the scouring was as described in Example 1.

The two sleeves dyed to approximately the same depth of shade.

Example 3

A second batch of N-(6-aminohexyl)-2-aminoethanesulfonic acid was prepared by the method described in allowed U.S. patent application Ser. No. 286,629, filed Sept. 6, 1972.

The material had an equivalent weight of 235, and contained 13.0 percent sulfur.

This material was used to make cationic-dyeable yarns in the method described in EXample 1.

Polymers were made using the same amounts of caprolactam, ω-aminocaproic acid, hypophosphorous acid, and manganous chloride tetrahydrate, but different amounts of N-(6-aminohexyl)-2-aminoethanesulfonic acid, of 5-sulfoisophthalic acid, sodium salt, and sodium bicarbonate. The leached and dried relative formic acid viscosities, the sulfur contents and the various amounts of sulfonates are listed below:

| N-(6-amino-hexyl)-2-aminoethane-sulfonic acid | 5 sulfo-isophthalic acid, sodium salt | NaHCO₃ | FAV* | ppm Sulfur | ** M.P. |
|---|---|---|---|---|---|
| 10.4 | 20.87 | 3.71 | 56.1 | 2630 | 217° |
| 11.5 | 22.20 | 4.12 | 50.7 | 2431 | 217° |
| 14.0 | 25.00 | 5.02 | 49.9 | 3111 | 216° |
| 17.1 | 28.60 | 6.13 | 43.8 | 3394 | 216° |

*formic acid viscosity
**melting point

These polymers were spun, plied and drawn s described in Example 1. The yarns were knitted into sleeves and dyed competitively in a dyebath having the same composition as that described in Example 1. All the yarns dyed to about the same depth of shade, but with the last two slightly darker than the first two.

Example 4

A sample of N-(6-aminohexyl)-2-aminoethanesulfonic acid was prepared and found to have an equivalent weight of 221.6, and a sulfur content of 14.4 percent.

12.33 grams of the above diaminosulfonic acid, 24.02 grams of 5-sulfoisophthalic acid and 4.0 grams of potassium bicarbonate was added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1.

The resulting polymer after monomer extraction and drying had a relative formic acid viscosity of 46.8, melting point 216°C. and a sulfur content of 3,000 ppm.

The polymer was colorless and opaque.

Example 5

(Comparative, diamino sulfonic acid additive only)

32.35 grams of N-(6-aminohexyl)-2-aminoethanesulfonic acid having an equivalent weight of 238 by HCl titration, 31.15 grams of azelaic acid, 14 grams of sodium bicarbonate, and 50 cc of water were added to a mixture of 80 grams of ω-aminocaproic acid, 0.0576 gram of manganous chloride tetrahydrate, and 0.1644 gram of 50 percent aqueous hypophosphorous acid in 1520 grams of caprolactam at 90°C. The mixture was polymerized as in Example 1.

The resulting polymer after monomer extraction and dyeing had a relative formic acid viscosity of 46.3 and a sulfur content of 2353 ppm sulfur. The DTA melting point, obtained by the same procedure as in Examples 1, 2, 3, and 4, was 214°C.

Example 6

9.2 grams of N-(6-aminohexyl)-4-aminobutanesulfonic acid, 20.88 grams of 5-sulfoisophthalic acid sodium salt and 3.1 grams of sodium bicarbonate was added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1, for 11½ hours.

The resulting polymer after monomer extraction and drying had a relative formic acid viscosity of 53.9, melting point 217°C. and a sulfur content of 2550 ppm.

The polymer was colorless and opaque.

This polymer was spun, plied and drawn as described in Example 1. The yarn was knitted into a sleeve and dyed in a dyebath having the same composition as that described in Example 1. The yarn dyed to about the same depth of shade as the polymer of Example 1.

Example 7

14.4 Grams of N-(6-aminohexyl)-4-aminobutanesulfonic acid, 15.3 grams of 5-sulfoisophthalic acid sodium salt, and 4.8 grams of sodium bicarbonate was added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1.

The resulting polymer after monomer extraction and drying had a relative formic acid viscosity of 71.0, melting point 216°C. and a sulfur content of 2530 ppm.

The polymer was colorless and opaque.

This polymer was spun, plied and drawn as described in Example 1. The yarn was knitted into a sleeve and dyed in a dyebath having the same composition as that described in Example 1. The yarn dyed to about the same depth of shade, as the polymer of Example 1.

THEORETICAL EXAMPLES

Following are theoretical examples, based on the actual examples, showing the way many other compounds would be used in the same type of additive system.

Example 8

N-(6-aminohexyl)-2-aminoethanesulfonic acid is prepared by the method described in U.S. Pat. No. 3,828,009, granted Aug. 6, 1974.

The diaminosulfonic acid of this example was titrated with HCl and the equivalent weight was found to be 238, compared to a theoretical 224. The sulfur content was found to be 13.3 percent.

9.7 grams of the above diaminosulfonic acid was dissolved in a mixture of 1520 grams of caprolactam, 80 grams of ω-aminocaproic acid, 0.1644 gram of a 50 percent aqueous solution of hypophosphorous acid, and 0.0576 gram of manganous chloride tetrahydrate at 90°C. A solution of 2.2 grams of sodium carbonate in 50 cc of distilled water was added and then 25.4 grams of 5-(p-sulfophenyl)-isophthalic acid sodium salt was also added.

This mixture was then charged to a 3-liter agitated reactor. The mixture was heated to 255°C. over a period of 1 hour while a nitrogen atmosphere was kept above the liquid. The liquid was stirred for 7½ more hours at 255°C. The polymer was then extruded out the bottom of the reactor, cut into cylindrical chips about 0.1 inch diameter and 0.1 inch long. Unreacted monomer was removed from the polymer by leaching four times at 100°C. with enough water to cover the chips. The polymer was then dried 16 hours at 100–105 C.

The product was an almost colorless, opaque polymer of 53.2 relative formic acid viscosity. The sulfur content was 2,530 ppm sulfur based on the weight of polymer.

The above polymer was spun, plied, and drawn at a draw ratio of 3.2 into a 140 filament/2100 denier yarn. The filaments were "Y" cross-section with a 3.2 modification ratio. The yarn was knitted into a sleeve, and dyed by immersing it for 1 hour at a temperature of 205°F. in a dyebath having the following composition:
  1 percent Hypochem CDL-60 (made by Highpoint Chemical Co., Highpoint, N. C.);
  2 percent Hypochem PND-11 (made by Highpoint Chemical Company, Highpoint, N. C.);
  0.5 percent Sevron Blue GCN (C.I. Basic Blue 97) and sufficient monosodium phosphate or disodium phosphate to adjust the pH to 7.0 ± 0.2.

Percentages of dyebath components are based on the weight of fabric dyed.

The water to goods ratio was 40 to 1.

The sample was then scoured at 160°F. in a bath containing 0.1 percent acetic acid and 0.1 percent Hypochem CDL 60 for 30 minutes. The sleeve dyed a deep blue. A control polycaprolactam yarn, without the salt of any sulfonic acid dyes only to a very light blue shade under the same conditions. The melting point of the polymer prepared with both additives as determined by Differential Thermal Analysis (DTA) was 216°C., compared to 220°C. for the control without additives.

Example 9

A sample of N-(meta-aminomethylbenzyl)-2-aminoethanesulfonic acid was prepared by essentially the method described in U.S. Pat. No. 3,828,009 granted Aug. 6, 1974, from metaxylyenediamine and 2-chloroethylsulfonic acid, sodium salt. The material had an equivalent weight, based on the sulfonic acid, of 257, and contained 12.8 percent sulfur.

10.5 grams of the above diaminosulfonic acid, and 28.6 grams of 2-sulfo-4,4'-bis-(carbomethoxy)-biphenyl, potassium salt and 2.80 grams of potassium carbonate were added to a mixture of 80 grams of ω-aaminocaproic acid, 0.0576 gram of manganous chloride tetrahydrate and 0.1644 gram of 50 percent aqueous hypophosphorous acid in 1520 grams of caprolactam at 90°C. The mixture was polymerized in 8¾ hours as was described in Example 1.

The resulting polymer after monomer extraction and drying had a relative formic acid viscosity of 44.2, melting point 216°C. and a sulfur content of 2510 ppm.

The polymer was colorless and opaque.

This polymer was spun, plied and drawn as described in Example 1. The yarn was knitted into sleeves and dyed in a dyebath having the same composition as that described in Example 1. The yarn dyed to about the same depth of shade as the polymer of Example 1.

Example 10

A sample of N-(aminocycloalkyl)-2-aminoethanesulfonic acid was prepared from isophorone diamine and 2-chloroethylsulfonic acid by the same method as described in U.S. Pat. No. 3,828,009, granted Aug. 6, 1974. Isophoronediamine is also known as 3-aminomethyl-3,5,5-trimethylcyclohexylamine. The isophoronediamine was obtained from Scholven Chemie AG. The diaminosulfonic acid was found to have an equivalent weight of 290, based on the sulfonic acid, and a sulfur content of 11 percent.

11.8 grams of the above diaminosulfonic acid, 32.6 grams of sulfophenylindanedicarboxylic acid, potassium salt and 4.1 grams of potassium bicarbonate were added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1.

The resulting polymer after monomer extraction and drying had a relative formic acid viscosity of 48.8, melting point 217°C. and a sulfur content of 2610 ppm.

The polymer was colorless and opaque.

This polymer was spun, plied and drawn as described in Example 1. The yarn was knitted into a sleeve and dyed in a dyebath having the same composition as that described in Example 1. The yarn dyed to about the same depth of shade, as the polymer of Example 1.

Example 11

3.86 grams of the diaminosulfonic acid described in Example 1, 24.02 grams disodium 4,4'-(dicarboxymethyl)diphenyl ether-2,2'-disulfonate and 1.72 grams of sodium carbonate was added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1.

The resulting polymer after monomer extraction and drying had a relative formic acid viscosity of 43.5, melting point 217°C. and a sulfur content of 2600 ppm.

The polymer was colorless and opaque.

This polymer was spun, plied and drawn as described in Example 1. The yarn was knitted into sleeves and dyed in a dyebath having the same composition as that described in Example 1. The yarn dyed to about the same depth of shade, as the polymer of Example 1.

Example 12

9.33 grams of N-(6-aminohexyl)-4-aminobutanesulfonic acid, 21.6 grams of sodium sulfo-2,6-naphthalenedicarboxylic acid, 3.29 grams of sodium bicarbonate was added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1, for 4 hours.

The resulting polymer after monomer extraction and drying had a relative formic acid viscosity of 38.5, melting point 216°C. and a sulfur content of 2,310 ppm.

The polymer was colorless and opaque.

This polymer was spun, plied and drawn as described in Example 1. The yarn was knitted into a sleeve and dyed in a dyebath having the same composition as that described in Example 1. The yarn dyed to about the same depth of shade, as the polymer of Example 1.

Example 13

11.24 grams of N-(6-aminohexyl)-4 aminobutanesulfonic acid, 20.8 grams of 5-sulfoisophthalic acid, magnesium salt and 1.98 grams of magnesium carbonate was added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1.

The resulting polymer after monomer extraction and drying had a relative formic acid viscosity of 42.3, melting point 217°C. and a sulfur content of 2530 ppm.

The polymer was colorless and opaque.

This polymer was spun, plied and drawn as described in Example 1. The yarn was knitted into a sleeve and dyed in a dyebath having the same composition as that described in Example 1. The yarn dyed to about the same depth of shade, as the polymer of Example 1.

Example 14

3.26 grams of N-(6-aminohexyl)-4-aminobutanesulfonic acid, 24.35 grams of disodium 4,4'-bis-(carboxymethyl)-diphenylether-2,2'-disulfonate and 1.08 grams of sodium bicarbonate was added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1.

The resulting polymer after monomer extraction and drying had a relative formic acid viscosity of 51.0, melting point 218°C. and a sulfur content of 2150 ppm.

The polymer was colorless and opaque.

This polymer was spun, plied and drawn as described in Example 1. The yarn was knitted into a sleeve and dyed in a dyebath having the same composition as that described in Example 1. The yarn dyed to about the same depth of shade, as the polymer of Example 1.

Example 15

A sample of N-(6-aminohexyl)-2-aminoethanesulfonic acid was prepared and found to have an equivalent weight of 238, and a sulfur content of 13.3 percent.

1.9 grams of the above diaminosulfonic acid, 18.5 grams of lithium 2,6-dicarboxynaphthalenedisulfonate and 0.34 gram of lithium hydroxide monohydrate was added to a mixture of 80 grams of ω-aminocaproic acid, 0.0576 gram of manganous chloride tetrahydrate and 0.1644 gram of 50 percent aqueous hypophosphorous acid in 1520 grams of caprolactam at 90°C. The mixture was polymerized as was described in Example 1 for 9 hours.

The resulting polymer after monomer extraction and drying had a relative formic acid viscosity of 46.8, melting point 218.5°C. and a sulfur content of 1,950 ppm.

The polymer was colorless and opaque.

This polymer was spun, plied and drawn as described in Example 1. The yarn was knitted into a sleeve and dyed in a dyebath having the same composition as that described in Example 1. The yarn dyed to a slightly lighter shade, than that described in Example 1.

The following Table I shows the structure of the compounds used in Examples 6 to 15.

TABLE I

| Example | Compound I | Compound II | Salt used for Acid Salt of Compound II |
|---|---|---|---|
| 6 | H$_2$N(CH$_2$)$_6$N(H)(CH$_2$)$_4$SO$_3$H | HOOC–C$_6$H$_3$(SO$_3$Na)–COOH (5-sulfoisophthalate) | NaHCO$_3$ |
| 7 | H$_2$N(CH$_2$)$_6$N(H)(CH$_2$)$_4$SO$_3$H | HOOC–C$_6$H$_3$(SO$_3$Na)–COOH (5-sulfoisophthalate) | NaHCO$_3$ |
| 8 | H$_2$N(CH$_2$)$_6$N(H)C$_2$H$_4$SO$_3$H | HOOC–C$_6$H$_3$–COOH with biphenyl–SO$_3$Na substituent | Na$_2$CO$_3$ |
| 9 | m-(H$_2$NCH$_2$)C$_6$H$_4$(CH$_2$N(H)C$_2$H$_4$SO$_3$H) | CH$_3$OOC–(biphenyl-SO$_3$K)–COOCH$_3$ | K$_2$CO$_3$ |
| 10 | 1,1,3,3-tetramethyl-cyclohexane substituted with CH$_2$NH$_2$ and NHCH$_2$CH$_2$SO$_3$H (or isomer with CH$_2$NHCH$_2$CH$_2$SO$_3$H and NH$_2$) | HO–C(=O)–indane(CH$_3$)$_2$–C$_6$H$_3$(SO$_3$K)–COOH with gem-dimethyl groups | KHCO$_3$ |

Table I—Continued

| Example | Compound I | Compound II | Salt used for Acid Salt of Compound II |
|---|---|---|---|
| 11 | H₂N(CH₂)₆NHC₂H₄SO₃H | CH₃O-CO-C₆H₃(SO₃Na)-O-C₆H₃(SO₃Na)-CO-OCH₃ | Na₂CO₃ |
| 12 | H₂N(CH₂)₆NH(CH₂)₄SO₃H | naphthalene with HOOC, COOH, SO₃Na | NaHCO₃ |
| 13 | H₂N(CH₂)₆NH(CH₂)₄SO₃H | benzene with HOOC, COOH, SO₃(Mg⁺⁺)₁/₂ | MgCO₃ |
| 14 | H₂N(CH₂)₆NH(CH₂)₄SO₃H | CH₃OC(O)-C₆H₃(SO₃Na)-O-C₆H₃(SO₃Na)-C(O)OCH₃ | NaHCO₃ |
| 15 | H₂N(CH₂)₆NH(CH₂)₂SO₃H | decalin with SO₃Li, COOH, HOOC, SO₃Li | LiOH · H₂O |

The following Table II shows alternative cycloaliphatic diamines which could be used to substitute for Compound I in Example 10. They are all found in Beilstein, *Organische Chemie* and available prior to 1972.

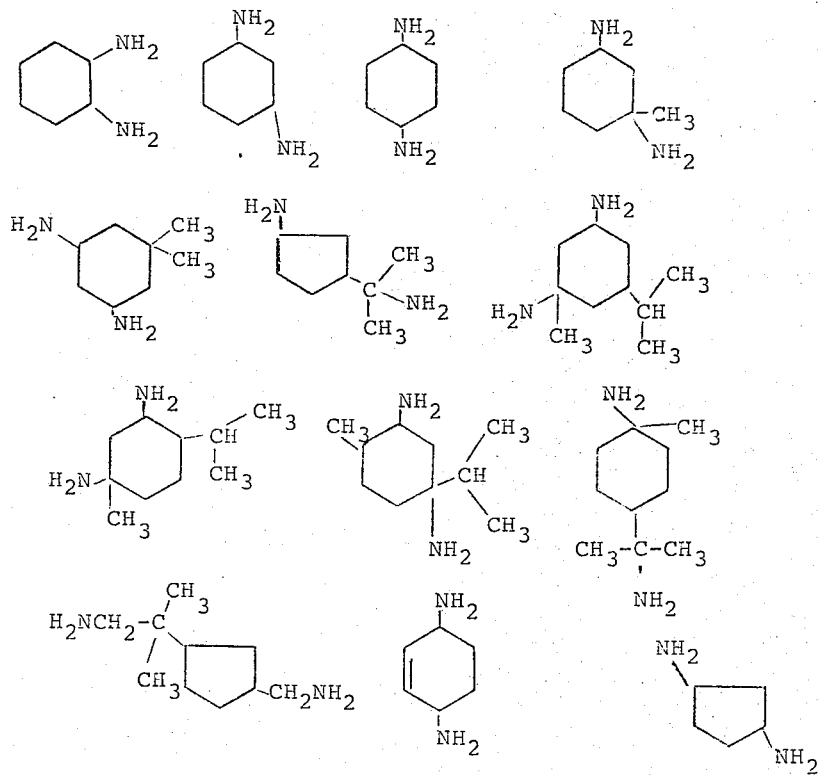

TABLE II

Table II—Continued

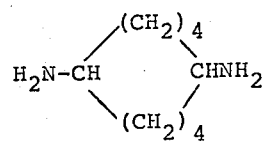 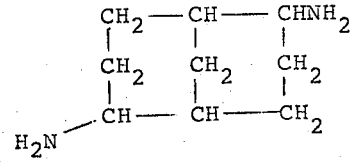

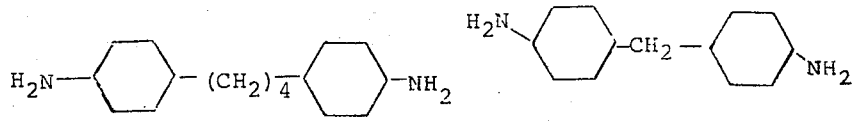

DISCUSSION

The combination of additives of this invention provides at least three benefits:

1. No dicarboxylic acid or diamine need be added to promote high polymer formation.
2. The melting point of the polymer is sufficiently high to allow high temperature processing of the yarn such as through a steam jet to crimp it at high speeds, not attainable with either additive by itself. Compare Examples 2 and 5 with Examples 1, 3, and 4, regarding melting points.
3. The cost of the materials when the combination of additives is used is lower than when either is used singly to achieve the same level of dye sites because a compound such as hexamethylene diamine (used with the dicarboxylic acid-sulfonate additive) or azelaic acid (used with the diaminesulfonate additive) is eliminated.

I claim:

1. A cationic-dyeable synthetic linear polycarbonamide having recurring amide groups polymerized from ω-aminocarboxylic acids or their lactams and containing as an integral part of the polymer chain from about 0.30 to about 0.85 mole percent based on the weight of polycarbonamide of units selected from the group consisting of the structures:

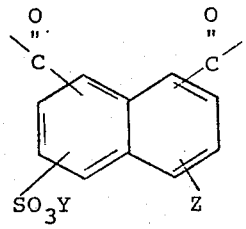 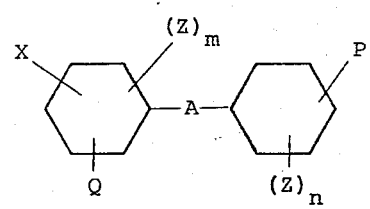

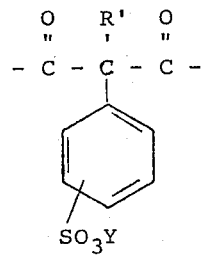 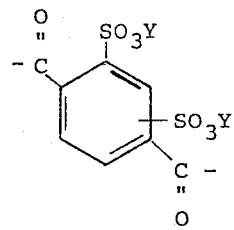

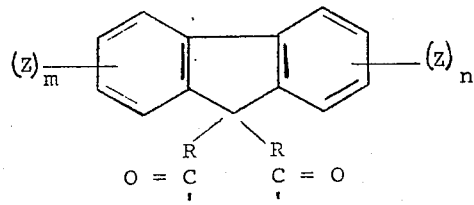 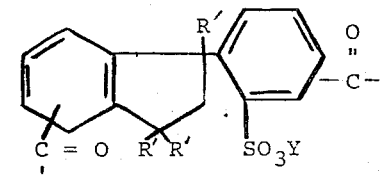

where X is a carboxyl, either P or Q is

and the other is H, and X and Q are not meta to each other, where Y is $NH_4^+$ or a metal of first or second group of the Periodic Table, $m+n = 1$ or 2, where Z is not ortho to a carboxyl; R is a straight chain radical of less than 10 carbon atoms, R' is H or R; A is a direct bond, $SO_2$, O, $CH_2$, $OCH_2CH_2O$, or $C(CH_3)_2$, Z is H or $SO_3Y$; provided that the two carboxylic substituents are not spaced closely enough to form imides; and from about 0.10 to about 0.65 mole percent of a cycloaliphatic diamine or a compound having units of the structures:

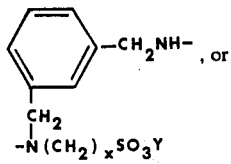 , or 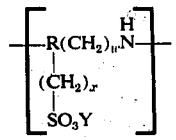

wherein x is 2,4,5 or 6; w is 2 to 12 and Y is $NH_4+$ or a metal of the first or second group of the Periodic Table.

2. The polycarbonamide of claim 1 wherein x is 2 and w is 6.

3. The polycarbonamide of claim 2 wherein the polycarbonamide is polycaprolactam.

4. A cationic dyeable synthetic linear polycaprolactam having recurring amide groups and containing as an integral part of the polymer chain from about 0.35 to about 0.85 mole percent based on the weight of polycarbonamide of units of the structure:

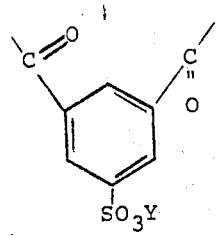

wherein Y is $NH_4+$ or a metal of the first or second group of the Periodic Table, and from 0.15 to about 0.65 mole percent of units of the structure:

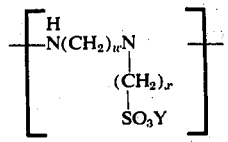

wherein w is 2 to 12; x is 4 to 6 and Y is $NH_4+$ or a metal of the first or second group of the Periodic Table.

5. The polycaprolactam of claim 4 wherein w is 6.

6. A method of preparing a cationic-dyeable synthetic linear polycarbonamide polymerized from ω-aminocarboxylic acids or their lactams by adding to said polycarbonamide prior to polymerization thereof from about 0.30 to about 0.85 mole percent based on the weight of polycarbonamide of a compound selected from the group consisting of:

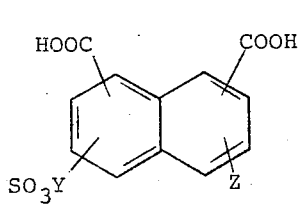 , 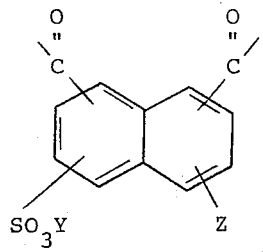 ,

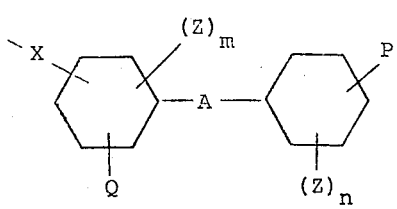 , 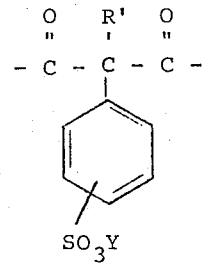 ,

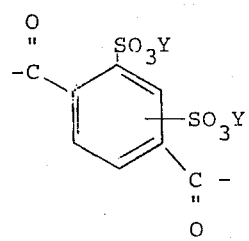 , 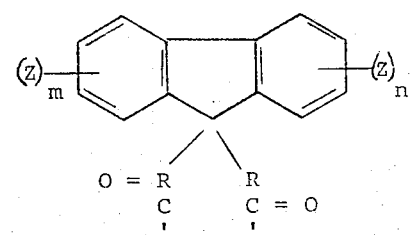 ,

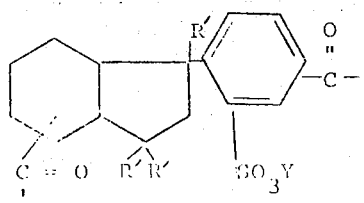 or 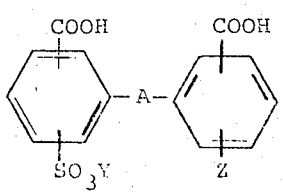

where X is a carboxyl either P or Q is

and the other is H, and X and Q are not meta to each other, where Y is $NH_4^+$ or a metal of first or second group of the Periodic Table, $m+n = 1$ or 2, where Z is not ortho to a carboxyl; R is a straight chain radical of less than 10 carbon atoms, R' is H or R; A is a direct bond, $SO_2$, O, $CH_2$, $OCH_2CH_2O$, or $C(CH_3)_2$, Z is H or $SO_3Y$; provided that the two carboxylic substituents are not spaced closely enough to form imides; and from about 0.10 to about 0.65 mole percent of a cycloaliphatic diamine or a compound having units of the structures:

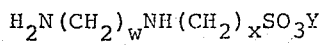

or

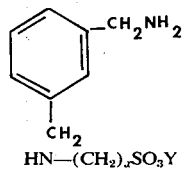

wherein $w$ is 2 to 12; $x$ is 2,4,5 or 6; Y is $NH_4^+$ or a metal of the first or second group of the Periodic Table and then polymerizing said polycarbonamide under normal conditons.

7. The method of claim 6 wherein said polymer is spun into filaments to form a cationic-dyeable yarn.

8. The method of claim 6 wherein $x$ is 2 and $w$ is 6.

9. The method of claim 6 wherein said polycarbonamide is polycaprolactam.

10. The method of claim 6 wherein said polycaprolactam is spun into filaments to form cationic-dyeable yarn.

* * * * *